(12) United States Patent
Daniel

(10) Patent No.: US 6,282,969 B1
(45) Date of Patent: *Sep. 4, 2001

(54) OPTICALLY CLEAR HOUSING AND REDUCED CURE TIME POTTING COMPOUND FOR USE WITH OBJECT SENSOR

(75) Inventor: Thomas R. Daniel, Fenton, MI (US)

(73) Assignee: Veleo Electrical Systems, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/163,719

(22) Filed: Sep. 30, 1998

(51) Int. Cl.$^7$ ............................ G01S 15/04; G01S 15/93; G08G 1/16

(52) U.S. Cl. ............................ 73/866.1; 73/629; 73/644; 367/93; 304/905; 304/435; 304/943; 304/693.5; 304/686.6

(58) Field of Search .................... 73/866.1, 431, 73/866.5, 629, 644; 180/169; 367/93, 99, 909; 340/904, 435, 943, 942, 933, 540, 693.5, 693.6, 693.9, 693.11, 693.12, 686.6

(56) References Cited

U.S. PATENT DOCUMENTS

| Re. 34,773 | 11/1994 | Dombrowski | 340/904 |
|---|---|---|---|
| 3,697,985 | 10/1972 | Faris et al. | 343/5 |
| 3,950,660 * | 4/1976 | McElroy | 73/644 X |
| 4,120,291 * | 10/1978 | Paton et al. | 73/620 |
| 4,240,152 | 12/1980 | Duncan et al. | 367/108 |
| 4,450,430 | 5/1984 | Barishpolsky et al. | 340/904 |
| 4,467,313 | 8/1984 | Yoshino et al. | 340/904 |
| 4,626,850 | 12/1986 | Chey | 340/903 |
| 4,632,898 * | 12/1986 | Fister et al. | 430/313 |
| 4,709,411 * | 11/1987 | Mori | 455/601 |
| 4,797,673 | 1/1989 | Dombrowski | 340/904 |
| 4,803,670 | 2/1989 | Chen | 367/99 |
| 4,910,512 | 3/1990 | Riedel | 340/943 |

(List continued on next page.)

FOREIGN PATENT DOCUMENTS

| 4431033A1 | * | 3/1996 | (DE) . | |
| 19703095C1 | * | 6/1998 | (DE) . | |
| 836101A2 | * | 4/1998 | (EP) . | |
| 2227839A | * | 8/1990 | (GB) | 362/311 |
| 9001953 | * | 4/1992 | (NL) . | |

OTHER PUBLICATIONS

Product Information Sheet, "ZYTEL 330 NC010 Transparent Nylon Resin," E.I. DuPont de Nemours and Company, 3 pages (Nov. 4, 1993).
Technical Data Sheet, "ULTRASON E 2010 Natural" Polyethersulfone, BASF Corporation, 2 pages (1995). Month not given.
Technical Data Sheet, "TERLUX 2802 TR," BASF Corporation, 2 pages (1995). Month not given.
Technical Data Sheet, "Product 5091" (NUVA–SIL), Loctite Corporation, 2 pages (Oct.–Dec. 1995).
Material Safety Data Sheet, "NUVA–SIL 5091 Self–Leveling UV Silicone," Loctite Corporation, pp. 1–4 (Jan. 22, 1996).
Product Information Sheet, "ZYTEL 330 Transparent Nylon Resin," E.I. DuPont de Nemours and Company, pp. 1–4 (1993). Month not given.

*Primary Examiner*—Thomas P. Noland
(74) *Attorney, Agent, or Firm*—J. Gordon Lewis

(57) ABSTRACT

A vehicle exterior object detector apparatus includes a transceiver carried within an optically clear housing and mounted by a holder to a support on the vehicle. A potting compound surrounds the transceiver within the optically clear housing, the potting compound having a cure time less than that of a heat curable potting compound. A heater element is carried in the holder in surrounding relationship with one end of the transceiver housing for melting ice and snow build up on the end of the housing for proper operation of the transmitter and receiver.

15 Claims, 4 Drawing Sheets

U.S. PATENT DOCUMENTS

| | | | | |
|---|---|---|---|---|
| 4,972,070 | * | 11/1990 | Laverty, Jr. | 250/221 |
| 4,976,150 | * | 12/1990 | Deka | 73/644 |
| 4,980,869 | | 12/1990 | Forster et al. | 367/99 |
| 5,111,210 | * | 5/1992 | Morse | 342/455 |
| 5,229,975 | | 7/1993 | Truesdell et al. | 367/907 |
| 5,373,482 | | 12/1994 | Gauthier | 367/99 |
| 5,394,292 | | 2/1995 | Hayashida | 361/179 |
| 5,402,508 | * | 3/1995 | O'Rourke et al. | 73/800 X |
| 5,463,384 | | 10/1995 | Juds | 340/435 |
| 5,485,140 | * | 1/1996 | Bussin | 340/436 |
| 5,594,428 | * | 1/1997 | Peterson | 340/825.36 |
| 5,844,471 | | 12/1998 | Daniel | 340/436 |
| 5,955,684 | * | 9/1999 | Grovel et al. | 73/866.5 |

\* cited by examiner

OPTICALLY CLEAR HOUSING AND REDUCED CURE TIME POTTING COMPOUND FOR USE WITH OBJECT SENSOR

BACKGROUND OF THE INVENTION

The present invention relates, in general, to a reduced cure time potting compound contained within an optically clear housing.

Traditional potting compounds used within a housing are generally a polyurethane type or similar polymeric compound. These compounds have to be cured by prolonged exposure to heat, which exposure can take up to 5 or more hours. The compounds also may not be as resilient/flexible as desired, and often may not be satisfactorily operative over as broad a temperature range as desired. This conventional type of potting compound has been known for use with proximity detectors because it protects vital components from the elements.

It is also known to provide one or more proximity detectors on the rear bumper and/or front and/or anywhere on the perimeter of a vehicle to detect an object within the perimeter of the vehicle when the vehicle or obstacle is in motion. Such devices are coupled to a control unit which calculates a distance measurement to the detected object and activates an audible alarm or a series of lights and/or camera/monitor provide an indication of the distance to the detected object.

Typically, the plurality of proximity detectors are mounted on the rear of the vehicle to cover an area slightly approximately as wide as the width of the vehicle. Generally, such proximity detectors are in the form of ultrasonic transceivers which transmit/receive an ultrasonic signal which is reflected by an object within the range of the transceiver. A suitable processing circuit determines the time between the transmission of the signal and the return of a reflected signal which is used to determine the distance to the detected object.

In the case of ultrasonic sensors, ice and snow build up on the bumper covering a portion or all of the outer surface of the ultrasonic transceiver, interfering with the transmission and reception of ultrasonic waves which renders the object detector inoperative.

Thus, it is an object of the present invention to provide a reduced cure time potting compound for use within a housing. It is a further object of the present invention to provide such a potting compound which advantageously flexibly binds to a large number/type of different components. Yet further, it is an object of the present invention to provide such a potting compound which is satisfactorily operative over a broad temperature range. Still further, it is an object of the present invention to provide a housing which would advantageously facilitate use of such a potting compound within the housing.

Further, it is an object of the present invention to provide a vehicle exterior object sensor with means to remove any ice or snow on the sensor mount. It is also an object of the present invention to provide a vehicle exterior object detector in which such means are easily incorporated in the sensor mount without requiring extensive modification to existing sensor designs.

SUMMARY OF THE INVENTION

The present invention addresses and solves the above-mentioned problems and meets the enumerated objects and advantages, as well as others not enumerated, by providing a sensor, comprising transceiver means for transmitting a signal and receiving a return signal reflected off of an object within a range of the transceiver means. The sensor further comprises an optically clear housing disposed about the transceiver means. A potting compound surrounds the transceiver means within the housing, which potting compound has a cure time less than that of a heat curable potting compound. The present invention further comprises an improved sensor apparatus for detecting an object exterior to a vehicle. Means are provided for mounting the transceiver on a support surface, such as the front and/or rear bumper and/or anywhere about the perimeter of a vehicle. Means are carried on the mounting means for elevating the temperature of the mounting means to remove ice and snow from the transceiver for proper operation of the transceiver.

In a preferred embodiment, the transceiver transmits an ultrasonic signal. The mounting means is in the form of a housing carrying the active components of the transceiver. A holder means is coupled to the housing for mounting the housing to a support surface, such as any of the front and/or rear bumper and/or anywhere on the perimeter of a vehicle. In a specific embodiment, the holder means has an enlarged diameter flange at one end of a through bore in which the end surface of the transceiver is disposed.

The means for elevating the temperature of the mounting means preferably comprises heating means carried on the housing for heating at least a portion of the housing surrounding the end surface of the transceiver. In one embodiment, the heating means comprises a resistive coil embedded (or carried on) in the enlarged diameter flange of the holder. In another embodiment, the heating means comprises a resistive film embedded within or carried on the enlarged diameter flange of the holder.

The apparatus of the present invention uniquely provides a means for using a UV light curable potting compound within a housing, which potting compound heretofore had been used substantially solely in exposed (not housed) applications. The apparatus of the present invention further uniquely provides a means of removing an exterior build up of ice and/or snow on the exterior portions of the transceiver and/or the holder to enable proper operation of the transceiver in all environmental conditions. The heating means is conveniently mounted on the enlarged flange of the holder without requiring extensive modification to existing sensor and sensor holder designs.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
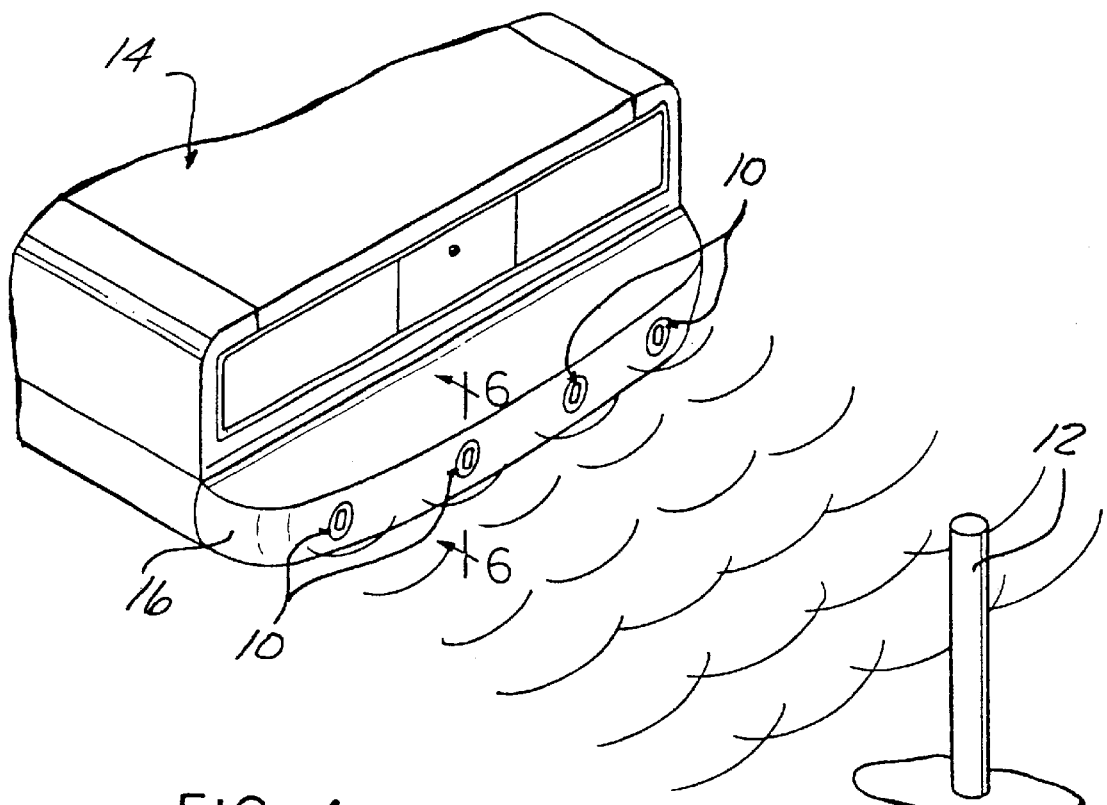
FIG. 1 is a perspective view of a heated vehicle exterior object sensor according to the present invention.

Referring now to the drawing, and to FIGS. 1–8 in particular, there is depicted a vehicle exterior object detector 10, which is adapted for detecting and providing an indication of object 12 to the front and/or the rear and/or anywhere within the perimeter of a vehicle 14.

Preferably, a plurality of identical detectors 10 are mounted on one or both of the front bumper and the rear bumper 16 of the vehicle and laterally spaced apart along the length of the bumper 16 to provide a combined detection range approximately as wide as the length of the bumper 16. Although the drawing depicts a rear bumper 16, it will be understood herein that the sensor apparatus of the present invention can also be mounted on a front bumper of the vehicle, or on any surface about the perimeter of the vehicle.

The exterior object detector 10 is formed of a transceiver housing 20 and a transceiver mounting means or mount 22. The housing 20 is formed of an assembly of components including a one piece base 24 which has a hollow, tubular portion 26 and an integral, generally perpendicularly extending concave portion 28. A plurality of terminals, all denoted by reference number 30, are insert molded within the tubular portion 26 to provide connections between the operative elements of the transceiver mounted within the housing 20 and external electrical connections.

Figure 4:
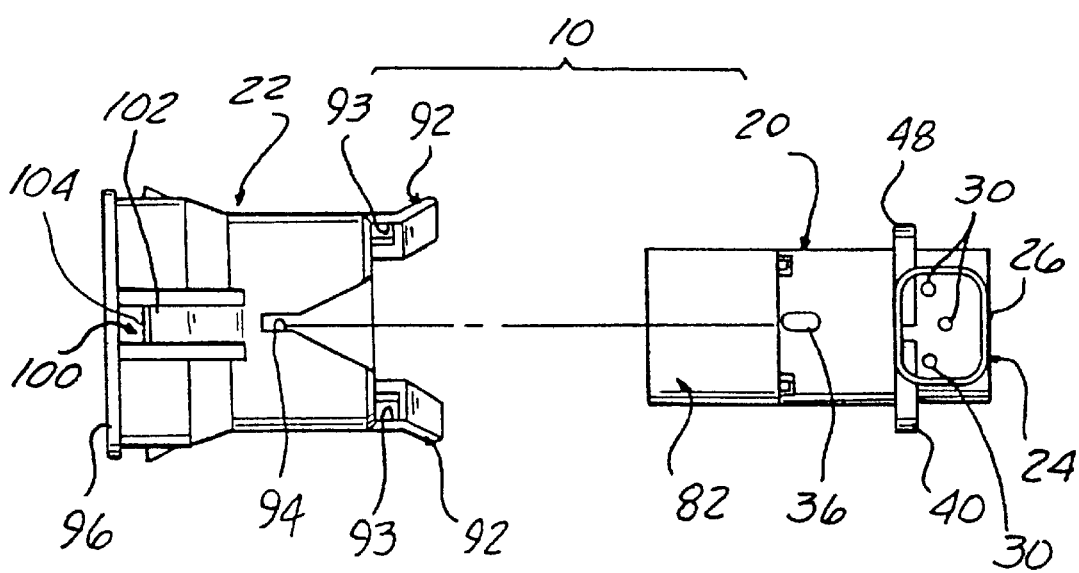
FIG. 4 is an exploded, bottom elevational view of the transceiver and mounting holder shown in FIG. 3.

The concave portion 28 is formed with a pair of parallel edges 32 and 34 at an upper end which have grooves extending therealong. A projection 36 is formed adjacent to one end of each groove 32 and 34, the purpose of which will be described in greater detail hereafter. As shown in FIG. 4, a key projection 36 extends outwardly from a lower surface of the concave portion 28 for keying the orientation of the housing 20 to the holder or mount 22, as also described hereafter.

A cover 50 also has a concave shape, generally complementary to the concave portion 28 of the base 24. Parallel side edges 52 and 54 are engageable with the edges 32 and 34 of the concave portion 28. A recess formed in each edge 52 and 54 is engageable with one projection 36 on the edges 32 and 34 to align the cover 50 with the base 24. The cover 50 is fixedly mounted on the base 24 by means of a slide and latch or other suitable fastening means.

Figure 2:
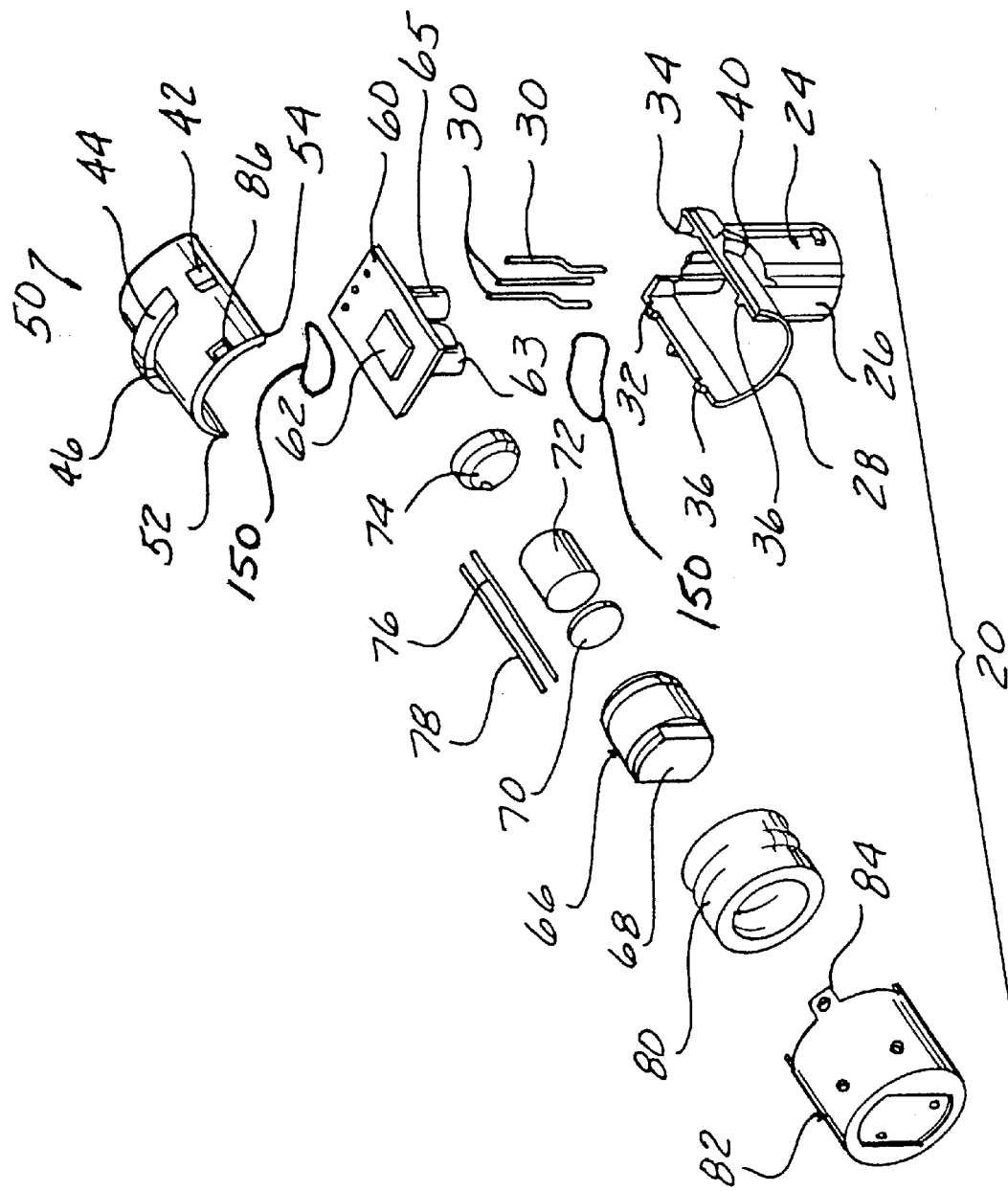
FIG. 2 is an exploded, perspective view of the transceiver portion of the heated vehicle exterior object sensor of the present invention.
Figure 3:
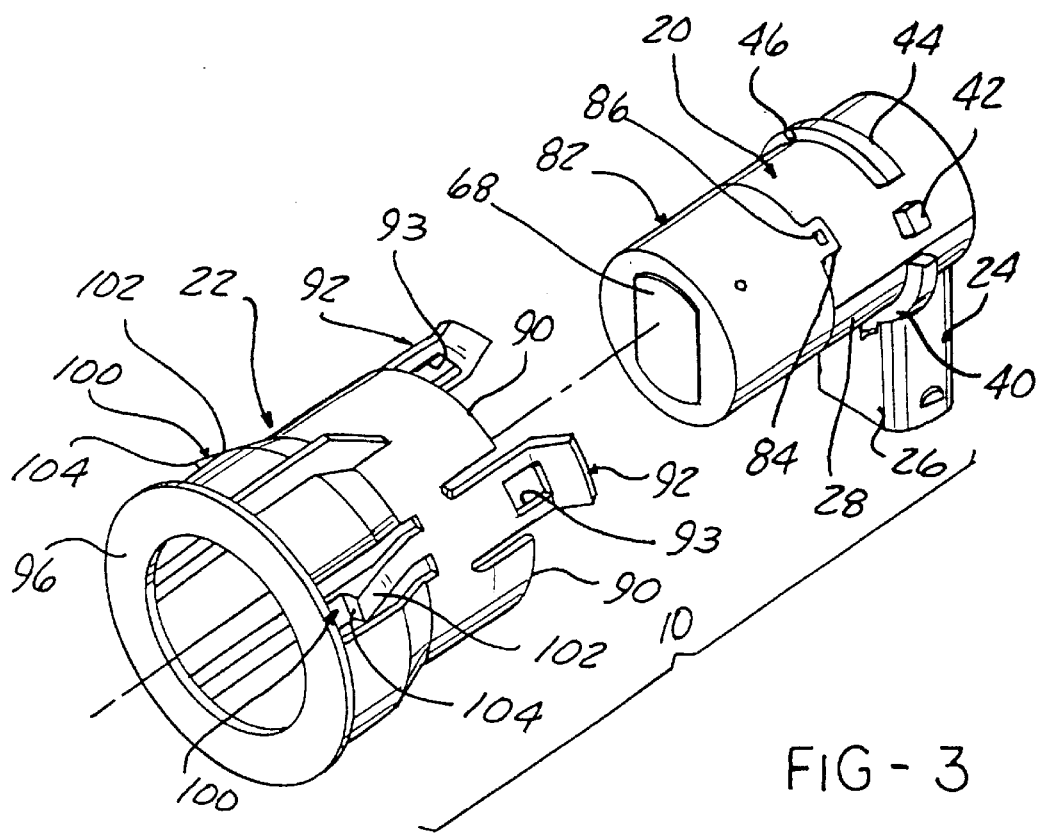
FIG. 3 is an exploded, perspective view showing the transceiver and mounting holder.

In addition, as shown in FIGS. 2–4, a plurality of co-planar ribs 40, 42, 44, 46 and 48 are co-planarily aligned and arcuately spaced about the concave portion 28 and the cover 50 when the cover 50 is engaged with the concave portion 28. The ribs 40, 44, and 48 have generally the same arcuate length and act as stops to limit insertion of the housing 20 into the mount or holder 22. The ribs 42 and 46 have a considerably smaller arcuate extent and form latch projections for latchingly receiving latch arms on the mount or holder 22, as described hereafter, to latchingly couple the holder 22 to the housing 20. At least the rib 42 has a ramp surface to assist in mounting the sensor in the holder 22.

A printed circuit board 60 is mountable within a cavity formed between the mated cover 50 and the concave portion 28 of the base 24. The printed circuit board 60 includes connections for the terminals 30 as well as integral conductive traces extending to pin connections on an integrated circuit chip 62 which is a control device, such as a microprocessor or ASIC, which executes a program for controlling the operation of the transceiver. A coil 63 is mounted on the PC board 60 and energized by the integrated circuit 62. A cap 65 adjacent to the coil 63 mounts in the base 24 to position the PC board 60 in the base 24. A potting compound 150 (shown schematically in FIG. 2) fills the interior cavity between the cover 50 and the concave portion 28 to surround and sealingly position the printed circuit board 60 within the housing 20.

The integrated circuit 62 forms, shapes and amplifies signals with suitable circuitry to receive an echo signal reflected from an object detected in the range of the transceiver to a digital signal and then transmitting the digital signal to an external controller, such as a vehicle electronic control unit, via the terminals 30. Processing of the signal to determine the distance to the detected object is preferably done by the vehicle electronic control unit.

A membrane 66 preferably formed of machined aluminum has a generally cylindrical shape with a hollow interior bounded by an open end and an opposed closed end surface 68. The closed end surface 68 is machined to a flat surface and is preferably anodized. Mounted within the membrane is a sequential arrangement of a resonating ceramic disc, such as a piezoelectric disc 70, which engages an inner surface of the closed end surface 68 of the membrane 66 to transmit ultrasonic signals therethrough, a dampening element 72, a resilient or rubber plug 74 which closes the open end of the membrane 66, and a pair of wires 76 and 78 which connect the disc 70 to the integrated circuit 62.

After the disc 70, the dampener 72 and the plug 74 securely mounted within the membrane 66, the membrane 68 is inserted into an additional dampening ring 80, also formed of rubber, by example only. The ring 80 and the membrane 66 are then securely mounted within a cap 82.

The cap 82 has one or more axially extending fingers 84, each with an interior aperture positioned to engage projections 86 on the end of cover 50 and the concave portion 28 to releasably couple the cap 82 to the cover 50 and base 24.

As shown in FIG. 3, when the components are assembled within the end cap 82, the end face 68 of the membrane 66 engages the disc 70 which, when energized by the circuit 60, resonances and generates a signal which passes through and is shaped by the end surface 68 to form an ultrasonic wave.

Figure 6:
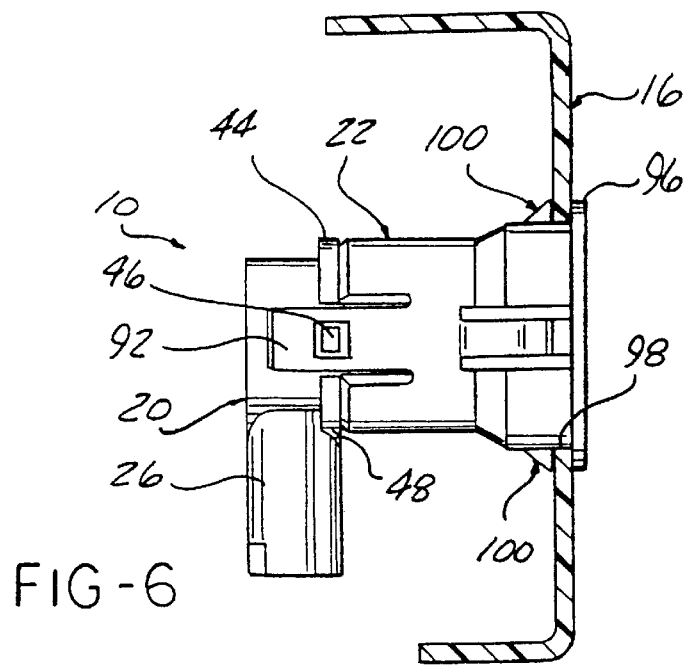
FIG. 6 is a cross-sectional view generally taken along line 6—6 of FIG. 1.

The mounting means 22 is preferably in the form of a holder, also depicted to by reference number 22, which releasably mounts the transceiver 20 to a fixed support, such as in an aperture formed in the bumper 16 of a vehicle 14 as shown in FIGS. 1 and 6.

The mounting means or holder 22, as shown in detail in FIGS. 3–7, is in the form of a generally cylindrical body having opposed ends and a through bore sized to receive the end cap 82. The first end of the holder 22 defines an annular edge 90 which is interrupted by at least one and preferably a plurality of two or more latch arms 92. Further, as shown in FIG. 4, an elongated key slot 94 with outward tapered ends is formed in the holder 22 and designed to slidably receive the key projection 36 on the base 24 to align the holder 22 with the transceiver housing 20. The annular edges 90 are adapted to engage the ribs 40, 44, and 48 on the transceiver housing 20 to limit the insertion of the housing into the holder 22.

Figure 5:
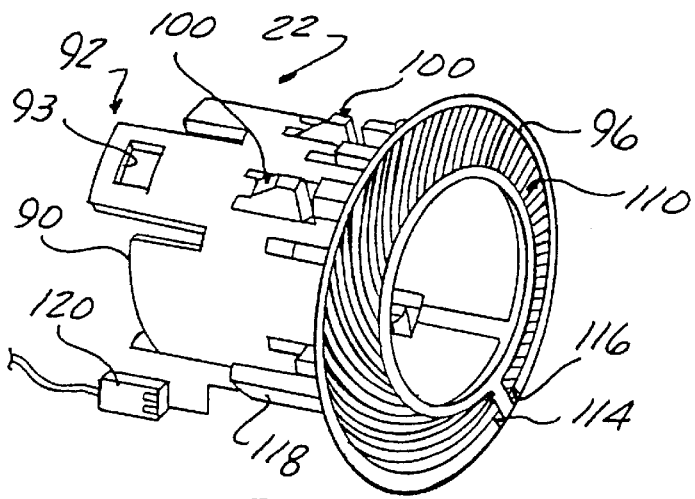
FIG. 5 is a perspective view of one embodiment of the mounting holder shown in FIGS. 3 and 4.

When the annular edges 90 engage the ribs 40, 44, and 48, the latch arms 92, each of which has an aperture 93 at an outer end, engages the shorter ribs 42 and 46 in a snap together connection to releasably interlock the holder 22 and the housing 20. It is seen in FIGS. 3, 5 and 6 that each latch arm 92 is spaced from adjacent portions of the body of the holder 22 by slots which position each latch arm 92 in a cantilevered manner from one end of the latch arm 92 integrally joined to the body of the holder 22 to enable each latch arm 92 to be urged radially outward upon initial engagement with the ribs 42 and 46 on the body 20. The holder 22 can be disconnected from the body 20 by outward force on the outer ends of the latch arms 92 sufficient to disengage the apertures 93 in each latch arm 92 from the respective ribs 42 and 46 on the body 20.

As shown in FIGS. 3–7, an enlarged diameter flange or bezel 96 is formed at an opposite end of the body of the holder 22 from the latch arms 92. The outer diameter of the bezel 96 is larger than the inner diameter of an aperture or bore 98 formed in the support surface, such as the vehicle bumper 16, to which the exterior object detector 10 is to be mounted, as shown in FIG. 6. At least one, and preferably a plurality, such as three, equicircumferentially spaced mounting arms 100 are carried on the body of the holder 22. Each mounting arm 100 is substantially identically constructed and includes a resilient arm integrally joined at one end to the body of the holder 22 and extending to an opposite end disposed adjacent to, but freely movable with respect to the bezel 96. Each mounting arm includes a tapered outer, raised surface 102 which terminates in an edge 104 spaced from the bezel 96. An annular slot or groove is formed between the bezel 96 and the edges 104 of each mounting arm 100 which is sized to the thickness of the support, such as the vehicle bumper 16, to which the holder 22 is mounted, as shown in FIG. 6.

The holder 22, in one example, can be mounted to the support surface or bumper 16 prior to connection to the transceiver housing 20. With reference to FIG. 6, the holder 22 is urged through the bore 98 in the support surface or bumper 16 until the bezel 96 contacts the outer surface of the bumper 16. During such insertion, the inner edges of the bumper 16 surrounding the bore 98 therein, engage and radially inward push the mounting arms 100 until the edges 104 of the mounting surface on each mounting arm 100 clear the inner surface of the bumper 16. At this time, each mounting arm 100 snaps outward capturing the bumper 16 between the edges 104 and the bezel 96. The transceiver housing 20 may then be coupled to the holder 22 to complete the vehicle exterior object detector 10 of the present invention. Alternately, the housing 20 can be mounted in the holder 22 prior to mounting the holder 22 in the bumper 16.

According to a unique feature of the present invention, as shown in one embodiment in FIG. 5, a means is provided for elevating the temperature of the holder 22 and, in particular, the bezel 96 to remove any snow or ice build up on the exterior end surface 68 of the membrane 66.

Figure 7:
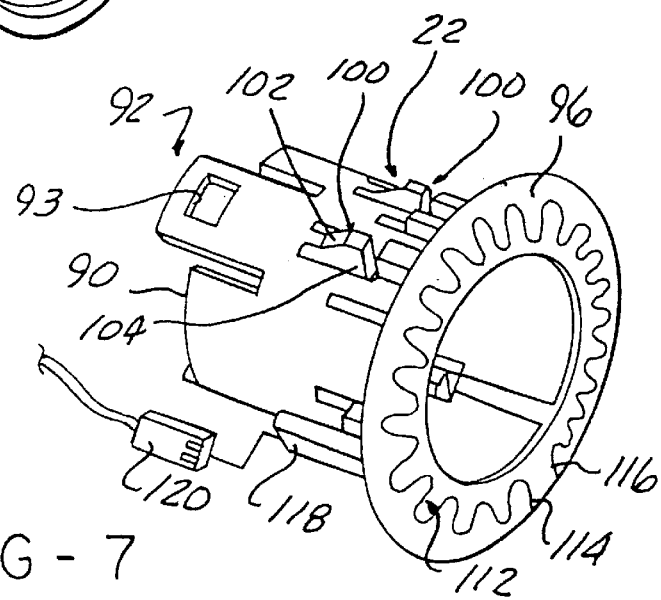
FIG. 7 is a perspective view of another embodiment of a mounting holder according to the present invention.

In the embodiment shown in FIGS. 5 and 7, the temperature elevating means is in the form of a heater means carried on the bezel 96. Preferably, the heater means, in the embodiment shown in FIG. 5, is in the form of a resistive grid or carbon film 110 which is integrally molded in the bezel 96 during the formation of the bezel 96 or afterwards by surface treatment of the bezel 96, such as via an electroplating process which forms a molded insert connect device (MID). The resistive grid or film 110 is disposed near the outer surface of the bezel 96.

In an alternate embodiment shown in FIG. 7, the temperature elevating means is in the exemplary form of a resistive wire 112 which is formed in a generally serpentine path on the bezel 96 by electroplating, insert molding, etc. Both of the resistive grid 110 and the wire 112 have opposed ends 114 and 116 which extend as conductive traces on the exterior surface of the bezel 96 and the body of the holder 22 to a suitable electrical termination or terminal 118 shown in both FIGS. 5 and 7. The terminal 118 may be an electrically conductive pad receiving a separate electrical connector 120 or an outwardly projecting contact which receives a snap on electrical connector 120. In this manner, an electrical circuit is completed from an exterior power source, such as a vehicle battery, to the resistive grid 110 or to the resistive wire 112.

Figure 8:
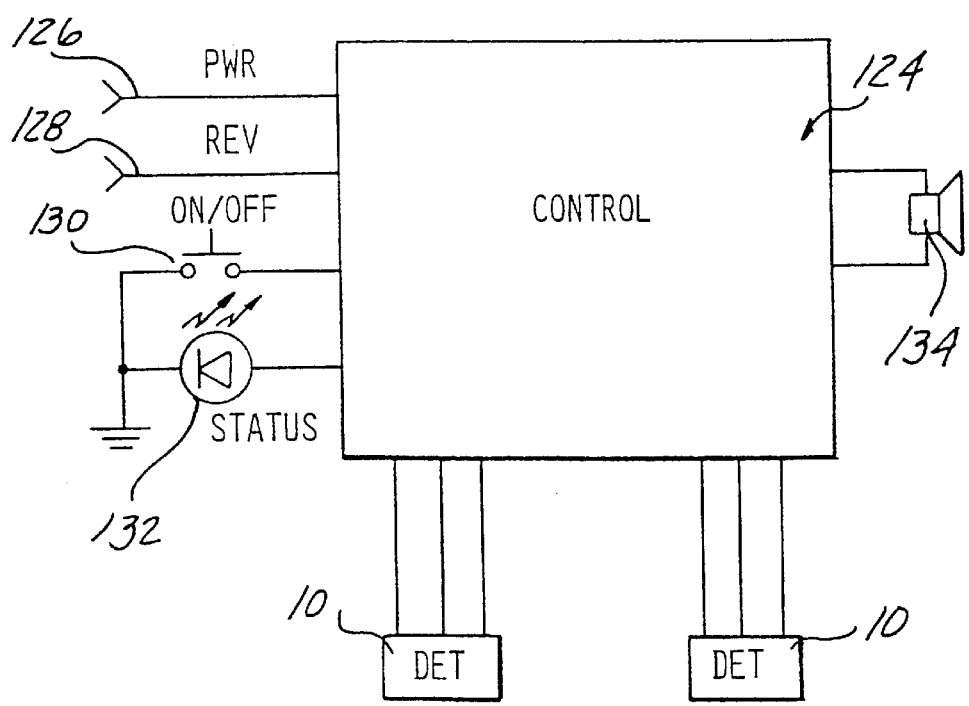
FIG. 8 is a schematic, block diagram of the control for the heated vehicle exterior object detector of the present invention.

Referring briefly to FIG. 8, there is depicted a control used with the vehicle exterior object detector 10. The control 124 is a dedicated electrical circuit or microprocessor based device receiving an electrical power input 126, a vehicle movement or engine running signal, such as a reverse input signal 128 when the vehicle is moving rearwardly in reverse gear or a forward input signal on forward vehicle movement within a preset speed range, an on/off switch 130, as well as a status input, such as an LED 132, indicating the on or off status of the exterior object detector 10.

The control 124 provides outputs to each of the detectors 10 mounted on the rear and/or front bumper of the vehicle. Specifically, the control 124 provides electrical power, a ground and a single wire for providing a control signal to activate each detector 10 to transmit a signal as well as providing a return path for the reflected signal where an object is detected within the range of any of the detectors 10.

An audible sound generator 134 is driven by an output signal from the control 124 and generates a sequence of audible sounds, such as successive beeps at a frequency or rate dependent on the distance to an object detected within the range of a detector. The control 124 provides a series of pulses to the sound generator 134 at a frequency whose attenuation rate increases as the distance between the vehicle and the detected object decreases. It will be evident that the sound generator 134 may be used with or replaced by a light display which can generate flashing lights, the frequency of which are dependent upon the distance to the detected object or a series of spaced lights, each corresponding to incremental distances.

Although not shown, a temperature sensor may be input to the control 124 or holder 24 to provide an ambient temperature signal. This will enable the control 124 to activate the temperature elevating means when the ambient temperature is below a preset temperature, such as 40° F.

A further preferred embodiment is predicated upon the unexpected discovery that a UV cured potting compound may be successfully and advantageously used, even within a housing, provided that the housing (eg. base 24 and cover 50) is preferably formed from an optically clear material. It is to be understood that the term "optically clear" as used herein is intended to incorporate anything which is transmissive to light (visible and/or invisible) of any and/or all wavelengths, as desired. As a specific example in the preferred embodiment using a UV cured potting compound, the "optically clear" base 24 and cover 50 would be transmissive at least to UV light, although they could be transmissive to light of other wavelengths as well.

As such, it has been found that potting material 150 may comprise a suitable silicone based UV cured potting compound. This is advantageous for many reasons, a few of which are mentioned here. Conventional potting compounds used within housings such as base 24 and cover 50 are heat cured polyurethanes and the like, which must be cured for 4–5 hours or even 8 hours or more. In sharp contrast, the UV cured potting compounds used in conjunction with the present invention are cured within seconds or minutes, eg.

10 minutes. It is to be understood that the cure time is dependent upon many factors including, but not limited to the UV wavelength, the size of the exposure window, the distance of the lamp to the application, and the volume of potting compound used. It is to be understood that there are several different types of UV bulbs (eg. "H", "V") having different wavelengths which correspond to variable curing depths and/or volumes. As such, it is to be understood that any bulb and/or any other means of UV irradiance may be used, as desired and/or necessary for a particular end use/application.

The use of a UV curable potting compound eliminates a costly manufacturing step (heating) and saves considerable time; both of which translate into efficiency and cost savings. A further advantage is that the UV cured silicone based potting compound used herein is flexible so as to prevent cracking and a consequent, undesirable release of a component(s); and also flexibly binds to the components over a desirably wide range of temperatures.

In the preferred embodiment, this compound comprises Product 5091 (Nuva-Sil), commercially available from Loctite Corporation. Nuva-Sil 5091 is a single component ultraviolet (U.V.) light and moisture curable self leveling silicone sealant. Upon exposure to U.V. light or atmospheric moisture this product forms a medium strength, highly flexible rubber sealant.

Some typical properties of Nuva-Sil Product 5091 appear below.

|  | Typical Value | Range |
|---|---|---|
| PROPERTIES OF UNCURED MATERIAL | | |
| Chemical Type    Modified Acetoxy Silicone | | |
| Appearance    Clear, Translucent liquid | | |
| Specific Gravity @ 25° C. | 1.01 | |
| Viscosity, @ 25° C., mPa.s (cP) | | |
| Brookfield RVT | | |
| Spindle 3 @ 10 rpm | 5,500 | 4,000 to 7,000 |
| Flash Point (TCC), ° C. | >100 | |
| TYPICAL PROPERTIES OF CURED MATERIAL | | |
| (cured @ 40 mW/cm² for 60 sec./side, | | |
| plus 7 days @ 50% RH & 23° C.) | | |
| Coefficient of thermal expansion, ASTM D696,/ | | |
| K⁻¹ 2.82 × 10⁻⁴ | | |
| Tensile Strength, ASTM D412, N/mm² | 1.0 | |
| (psi) | (145) | |
| Elongation, ASTM D412, % | 100 | |
| Hardness, ASTM D2240, Shore A | 34 | |
| Water absorption, 24 hrs. @ Room Temp., % | 0 | |
| Shrinkage, % | 0.2 | |
| Tear (die B), ASTM D624, kN/m | 0.7 | |
| (pli) | (6) | |
| Water vapor transmission, ASTM E96, gram/hr./M² | 0.458 | |
| Non-volatile content, % | >95 | |
| Compression Set, ASTM D395 Method B, % | | |
| After 70 hrs. @ room temperature | 5 | |
| After 70 hrs. @ 75° C. | 30 | |
| After 70 hrs. @ 100° C. | 52 | |

Normal processing conditions may include exposure to sufficient UV light irradiance to effectively cure the Nuva-Sil material. Although functional strength is developed almost instantly due to the UV curing nature of the Nuva-Sil, depending upon the volume of material, full performance properties generally develop over 72 hours.

When curing with sufficient UV light irradiance, exposed Nuva-Sil material will cure dry to the touch in seconds. Atmospheric moisture controls the cure of material not exposed to UV light. Typically, depending upon the volume of material, non-UV light cured areas will skin over in approximately 8 minutes and become tack free in 13 minutes.

The table below lists the difference in three important physical properties between UV light only and moisture only cure parameters.

| | (% of Full Cure Values) | |
|---|---|---|
| Cure Only | a. UV Cure Only | b. Moisture |
| Hardness durometer | 98 | 50 |
| Tensile strength, psi | 100 | 57 |
| Elongation, % | 90 | 47 | a. 40 mW/cm² for 60 seconds/side
b. 7 days room temperature, 50% R.H. (no UV exposure)

In a preferred embodiment, base 24 and cover 50 are formed of an optically clear material. In the preferred embodiment, this material allows adequate passage of ultraviolet (UV) light therethrough (transmissivity). It is preferred than a material tending to be more amorphous in nature be used. The molecular structure of amorphous materials is more sparse than that of semi-crystalline or crystalline materials. The looser bond structure of the amorphous material allows more light to pass through (whereas crystalline structures generally do not allow adequate light to pass through). The material may be chosen depending upon the requirements of a particular end use. As a material moves toward more crystalline in structure, it becomes less brittle at cold temperatures; and is more resistant to various chemicals or solvents. This may be desirable and/or necessary in a particular application.

It is to be understood that any suitable optically clear material may be used. However, in the preferred embodiment, a substantially amorphous material is used. One such preferred material is commercially available from Du Pont under the trademark ZYTEL 330 transparent nylon resin is used. This resin is an amorphous, transparent nylon which has good resistance to chemicals and flexural fatigue, and possesses high strength and stiffness (especially over the temperature range typical in automotive applications). The ZYTEL 330 offers excellent transparency even in thick sections, and is very strong and stiff, yet has high elongation even when dry as molded. The ZYTEL 330 also has good electrical insulation properties. Some exemplary properties of ZYTEL 330 follow. Light transmission using test method ASTM D1003 is 88% (dry as molded). Haze under test method ASTM D1003 is 15% (dry as molded). Refractive index under test method ASTM D543 is 1.588 (dry as molded). Elongation under test method ASTM D638 is 215% (dry as molded); and 250% (50% RH). A more specific designation of the ZYTEL 330 which is preferred in the present invention is available as ZYTEL 330 NC010.

An alternate preferred material for base 24 and cover 50 is commercially available from BASF Corporation under the trademark TERLUX 2802 TR, which is a methyl methacrylate/acrylonitrile/styrene/butadiene/polymer. TERLUX is a transparent, amorphous thermoplastic. This polymer has properties typical of ABS, but combined with high clarity. At room temperature, the transparency of TERLUX is more than 85% at 450 nm, and extends to more than 90% at longer wave lengths.

A further alternate preferred material is commercially available from BASF Corporation under the trade name Ultrason E 2010 Natural. This is a polyethersulfone material, and has a light transmittance of almost 90% at 700 nm. Each of the alternate materials from BASF Corporation mentioned immediately above are amorphous materials.

A further alternate amorphous material which would be suitable for use as the base 24 and cover 50 would be an appropriate grade of LEXAN polycarbonate commercially available from General Electric.

It is to be understood that cap 82 may also optionally be formed from a suitable optically clear material such as, for example, one of the optically clear materials mentioned hereinabove.

In summary, there has been disclosed a unique means for elevating the temperature of a vehicle exterior object sensor which is capable of removing any snow and/or ice build up on the sensor which could interfere with or render the sensor inoperable. The temperature elevating means is integrally carried on the holder which mounts the sensor to a support surface on a vehicle thereby providing a simple, integral, assembly with a minimal number of separate components.

There has also been disclosed an optically clear housing and reduced cure time potting material within the housing for use with such a vehicle exterior object sensor. The clear housing allows UV light to pass therethrough, which UV light cures a suitable silicone based potting compound within seconds/minutes, thus eliminating the need for lengthy heat curing of traditional housed potting materials. Additional advantages of the UV cured potting compound include the following. There is no need to provide special heating and/or cooling of the UV curable material before or during dispensing (as may be required with conventional polyurethane type heat curable compounds); dispensing volumes of the UV curable material may be easily controlled in a variety of ways; no special mixing of the UV curable material is necessary, nor is it necessary to introduce any special additives; and material packaging is very portable.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A sensor, comprising:
    transceiver means for transmitting a signal and receiving a return signal reflected off of an object within a range of the transceiver means;
    an optically clear housing disposed about the transceiver means, wherein the optically clear housing is transmissive to UV light; and
    a potting compound surrounding the transceiver means within the housing, the potting compound having a cure time less than that of a heat curable potting compound, wherein the potting compound is a UV cured potting compound.

2. The apparatus of claim 1 wherein the transceiver means transmits an ultrasonic signal.

3. The apparatus of claim 1 wherein the potting compound is a single component ultraviolet light curable self leveling silicone sealant.

4. The apparatus of claim 1 wherein the optically clear housing is formed from an amorphous polymeric material.

5. The apparatus of claim 4 wherein the amorphous polymeric material exhibits good resistance to chemicals and flexural fatigue, and possesses high strength and stiffness over the temperature range typical in automotive applications.

6. The apparatus of claim 4 wherein the polymeric material has the following properties: light transmission using test method ASTM D1003 is 88% (dry as molded); haze under test method ASTM D1003 is 15% (dry as molded); refractive index under test method ASTM D543 is 1.588 (dry as molded); and elongation under test method ASTM D638 is 215% (dry as molded), and 250% (50% RH).

7. The apparatus of claim 4 wherein the UV light curable silicone sealant has the following properties: coefficient of thermal expansion, ASTM D696,/K$^{-1}$ is 2.82×10$^{-4}$; tensile strength, ASTM D412, N/mm$^2$ is 1.0, (psi) is (145); elongation, ASTM D412 is 100%; hardness, ASTM D2240, Shore A is 34; water absorption, 24 hrs. @ Room Temp. is 0%; and shrinkage is 0.2%.

8. An object detection apparatus comprising:
    transceiver means for transmitting a signal and receiving a return signal reflected off of an object within a range of the transceiver means;
    an optically clear housing disposed about the transceiver means;
    a potting compound surrounding the transceiver means within the housing, the potting compound having a cure time less than that of a heat curable potting compound;
    means for mounting the transceiver means on a support, the mounting means including a holder coupled to the transceiver means, the holder having an end facing exteriorly of an exterior surface of the support and disposed adjacent an end of the transceiver means; and
    heating means, carried by the end of the holder, for elevating the temperature of at least the end portion of the transceiver means to remove meltable material disposed on the transceiver means.

9. The apparatus of claim 8 wherein the mounting means further comprises:
    the end of the holder having an enlarged end flange engageable with the support and disposed exteriorly of an exterior surface of the support.

10. The apparatus of claim 8 wherein the transceiver means transmits an ultrasonic signal.

11. The apparatus of claim 8 wherein the potting compound is a UV cured potting compound.

12. The apparatus of claim 11 wherein the optically clear housing is transmissive to UV light.

13. The apparatus of claim 11 wherein the potting compound is a single component ultraviolet light curable self leveling silicone sealant.

14. The apparatus of claim 8 wherein the optically clear housing is formed from an amorphous polymeric material.

15. The apparatus of claim 14 wherein the amorphous polymeric material exhibits good resistance to chemicals and flexural fatigue, and possesses high strength and stiffness over the temperature range typical in automotive applications.

* * * * *